Dec. 6, 1966   L. R. MAXWELL   3,289,471
DYNAMOMETER

Filed Dec. 23, 1964   4 Sheets-Sheet 1

INVENTOR:
LLOYD R. MAXWELL
BY
Howson & Howson
ATTYS.

Dec. 6, 1966  L. R. MAXWELL  3,289,471

DYNAMOMETER

Filed Dec. 23, 1964  4 Sheets-Sheet 3

INVENTOR:
LLOYD R MAXWELL
BY Howson & Howson
ATTYS.

Dec. 6, 1966          L. R. MAXWELL          3,289,471

DYNAMOMETER

Filed Dec. 23, 1964                                                  4 Sheets-Sheet 4

INVENTOR:
LLOYD R. MAXWELL
BY Howson & Howson
ATTYS.

United States Patent Office 3,289,471
Patented Dec. 6, 1966

3,289,471
DYNAMOMETER
Lloyd R. Maxwell, Bradford Hills, Downingtown, Pa.
Filed Dec. 23, 1964, Ser. No. 420,651
23 Claims. (Cl. 73—117)

This is a continuation-in-part of application Serial No. 46,957, filed August 2, 1960 and now abandoned.

This invention relates to a dynamometer device which has particular application to vehicular testing of various types. The present invention also relates to special methods or techniques of using the device of the present invention. The term "dynamometer" as used herein applies equally well to precision devices, for laboratory use on one hand, and to a rather crude arrangement for testing in the field, on the other.

Dynamometers in laboratories are frequently electrical motors having their frame, on which the field windings are wound, trunnion mounted on a fixed support to rotate coaxially about the same axis as the motor shaft. The movable frame is commonly provided with a lever arm to which weights may be added to achieve static tare balance and rotation of the frame from this zero position is accepted as an indication of torque effect. However, even the most refined laboratory dynamometer is subject to errors due to the fact that dynamic losses may, and ordinarily do, differ from static losses in the dynamometer itself and dynamic losses cannot be completely compensated using static techniques. No completely satisfactory dynamic technique has been developed so that effort has been directed in the past to minimizing rather than eliminating error producing dynamic effects such as friction. Most of the dynamic losses which cannot be dynamically compensated are in the trunnion mounting bearings, and, therefore, highly complex and expensive bearing arrangements and systems for eliminating friction have been employed. At great cost these have minimized friction but never established a dynamic frictionless condition.

Furthermore, a laboratory dynamometer depends for its accuracy upon the direct coupling of the dynamometer shaft to the load to be tested. If there are intermediate coupling elements between the shaft and the load to be tested additional frictional and other loss effects due to these coupling elements and not to the load to be tested will be introduced. Heretofore there has been no known way for accurately recovering and measuring these losses outside the dynamometer and the load to be tested. Therefore, it has been necessary for accuracy that the load to be tested be directly coupled to the dynamometer shaft. This is the reason why, for example, an engine has had to be removed from a vehicle and directly coupled to the shaft of a dynamometer to accurately measure its power.

So called "chassis dynamometers" are an example of field devices which provide an intermediate structure between the shaft of the test load device and the actual load to be tested. In such devices the test load device may be a trunnion mounted motor statically balanced just as in laboratory devices or it may be another kind of device including a purely load absorbing means. Whether they are crude or relatively elaborate devices, it is characteristic that field dynamometers suffer greater error because they employ structure intermediate the shaft of the test load device and the device to be tested including additional bearings and other loss producing elements. In the prior art there has been no satisfactory way to accurately compensate or eliminate this greater error.

In the automotive field, chassis dynamometers are widely used for certain very simple tests, but for a thorough analysis, it has been considered necessary to remove an engine from a vehicle to make direct measurements on it using a laboratory type dynamometer. The results of this type of testing may indicate that the fault is not with the engine which is performing properly and efficiently and thus that the effort expended in removing the engine from the vehicle has been in vain. However, for thorough analysis and because analysis of the engine is essential to analysis of the rest of the system it has been necessary to remove and test the engine.

The present invention is not limited to laboratory or field dynamometers but will have widest application in the field type. Its simplicity not only permits inexpensive construction but lends itself to rugged construction as well. A chassis dynamometer of the present invention is much simpler than many of the prior art chassis dynamometers, yet it is highly accurate to a degree comparable with laboratory type devices. For this reason, the present dynamometer is capable of uses not heretofore possible or even believed possible of a field type dynamometer, and it is capable of making the various possible tests with an ease and speed well beyond capabilities of prior art field dynamometers. However, the present invention is by no means limited to use in the field but will find wide use in the laboratory where it will permit greater precision at much less cost than has been previously possible.

The present invention makes possible a highly accurate balancing out not only of the static effects of friction and other loss factors but also of dynamic effects. Moreover, and perhaps even more important, the present invention for the first time makes possible balancing out static and dynamic effects in the test load device itself, as well as in all associated structure including all structure between the test load device and the device to be tested. This is accomplished by a simple means employing but a single simple adjustment step to null out all losses and establish an elevated zero while the equipment is operating dynamically at a steady-state speed. Furthermore, this arrangement permits an ease in detection of the error effects such that it is possible to make readjustment before each use so that at all times the dynamometer is accurate and its accuracy does not deteriorate from some predetermined calibration or setting. Calibration of the device is also easily and accurately achieved without use of a load to be tested. Thus, in testing a particular vehicle in various parts of the country under completely different circumstances, those running tests will be in no doubt as to whether a difference in performance is due to effects in the vehicle or differing error producing effects from one dynamometer to another. The present invention thus makes possible for the first time, dynamometer devices, and particularly field devices, which can provide a uniformity in testing not heretofore possible or even believed possible.

The present dynamometer makes it possible to provide a chassis dynamometer to measure accurately and directly the tractive effort of a vehicle and the horsepower delivered at the road surface by its wheels. By analysis, because of balancing out of loss effects it is additionally possible to determine to a high degree of accuracy whether full horsepower is being delivered by the engine and therefore whether losses are in the engine or elsewhere in the system. To a considerable extent, it makes possible the pinpointing of areas of inefficiencies or damage so that they may be corrected with a minimum of effort and thereby avoids the necessity of making costly piece-by-piece analysis such as an analysis of the engine which required removal from the vehicle. The present dynamometer also permits standard tests of all types, such as those for brakes, to a higher degree of accuracy than in the past.

More specfically, the present invention relates to a dynamometer system based upon the use of a so-called "torque frame" on which a rotatable test load device is mounted. The torque frame is a structure rotatably supported relative to the ground in trunnion bearings. The test load device is coupled to the load to be tested by a drive shaft rotatably supported relative to the torque frame and coaxial with the axis of rotation of the torque frame. The test load device must be out of alignment with this drive shaft but appropriately coupled to it by a drive connection. The test load device constitutes all structures rotatable relative to the torque frame and supported by the torque frame up to the shaft and out of line with the shaft. The total arrangement of torque frame and all structure fixed to it collectively, including the test load device, will be either statically or dynamically out of balance, or both, about said drive shaft when the system is stationary. Between the ground and the torque frame at a point of imbalance remote from the drive shaft there is provided energy storage means so that it absorbs the force of any imbalance of the torque frame. In such a system the position of the torque frame relative to the ground is representative of tractive effort, so that means indicating the position of the torque frame may be directly calibrated in terms of tractive effort. Rotation of the system imparts a torque to the torque frame which causes a change in frame position. The horsepower of the entire system coupled to the test load device at a given time is reflected in the test load device causing greater or less loading of the test load device. Any change in loading of the test load device is accompanied by a corresponding change in the reactive torque effects which is stored as potential energy in the energy storage means as the torque frame assumes new test positions. Zero adjustment means is provided so that under dynamic conditions of operation any selected position of the torque frame may be taken as a zero position from which measurement may be made.

The use of the torque frame which supports most of the dynamometer structure, the rotatable part of which is known herein as the "test load device" enables direct measurement of tractive effort or of horsepower, as a result of observation of the position of the torque frame, relative to ground under the dynamic conditions of actual use. Of special importance is the fact that this arrangement permits for the first time, the use of an "elevated zero," a zero setting or corrective positioning of the torque frame to compensate for the dynamic effects, such as friction and windage losses and the like, as well as static effects, not merely in the test load device, but in all structure intermediate to it and the device to be tested, as well as in the device to be tested itself. This compensation is done entirely without the use of weights or the equivalent. The dynamometer of the present invention treats all losses as loads. Each total load, including losses, is manifested as a unique torque frame position and when no load is present in the conventional sense, the whole load may be loss effects. If the test load device is run at the same speed at which tests are to be made, the new position assumed by the torque frame exactly compensates the torque effect required to overcome all losses. The position assumed by the torque frame under the effects of static and dynamic losses then may be selected as the elevated zero point and meters adjusted to zero at that position of the torque frame assumed at the same speed as that used in further testing. By using a test load device capable of motoring as well as load absorbing the test load device may be raised to the desired testing speed with no load imposed and it may be reasonably assumed that the new torque frame position assumed will be effective to balance out frictional and other loss effects in the whole structure. With the device to be tested connected to the dynamometer, the same amount of torque or horsepower is required to eliminate all losses, whether static or dynamic, from the reading and move the torque frame at test speed through the same position. Movement of the torque frame beyond this elevated zero position must then be attributable to the load. This "elevated zero" technique has never been known or used in the prior art. According to the present invention it is even possible to connect into the system in addition to the load coupling rolls for supporting wheels in a chassis dynamometer, additional tandem and/or idler rolls provided they are positively driven by the system without slippage, and the elevated zero technique will also balance or null out the effect of their frictions and other losses. Torque required to drive a device to be tested, such as an automobile on the rolls, will then be the total torque less the torque required to compensate losses in the system. If the latter system losses have been compensated by providing the torque frame with an "elevated zero" at the torque required to compensate system losses at a predetermined speed, torque above the elevated zero will represent test load device losses.

With the load in place coupled to the dynamometer and running at test speed a new elevated zero is determined for the specific device to be tested. This new elevated zero setting, in effect nulls out the frictions and other losses of the load, the test load device and the coupling structure. The difference in the no load and full load elevated zeros is a measure then of the frictions and losses of the load and may be desired and useful information. The dynamometer may thereafter be used to measure torque or horsepower effects as the result of changes in the load. For example, measurements such as engine horsepower readings, require an acceleration and/or deceleration effect whose torque effect is measured from the elevated zero. Because of the elevated zero technique, the present invention for the first time makes possible the measurement of gross engine horsepower delivered at the clutch without removing the engine from the vehicle. Methods employed to achieve engine horsepower measurements are completely new.

It will be observed that the total inertia of the rotatable part of the system defined hereafter as the test load device, which may consist of a motor, a motor and a flywheel or just a flywheel, together with the rest of the rotatory structure, can be made sufficient to tend to maintain a certain speed against sudden accelerating and decelerating forces. In such case, application of a force tending to change an established speed will first manifest itself as a torque or tractive effort effect. This can be read in accordance with the present invention as providing a certain positive or negative horsepower effect above or below that necessary to maintain a fixed speed. Horsepower readings taking a steady state condition of the dynamometer and load under test combined as elevated zero make possible direct calibration or simple computation of total engine horsepower readings not heretofore possible. This is made possible by making readings both up and down from a particular speed. Thus, for example, starting at a steady state fixed speed condition taken as torque or horsepower zero and fully accelerating the engine to drive the dynamometer up from that particular speed will give a positive horsepower reading during acceleration before the speed changes. On the other hand declutching the same engine while motoring the system at the same speed will give a decelerating or negative horsepower reading before the speed changes. The sum of these two horsepower readings will provide in total the gross engine horsepower delivered at the clutch.

For a better understanding of the present invention, reference is made to the following drawings, in which.

My United States Patent No. 3,020,753 issued February 13, 1962, for Testing Device has reference to a simple dynamometer device which has application parallel to the dynamometer of the present invention. It will be understood that the preferred arrangement of rolls and other intermediate elements between the test load device and the load to be tested may be essentially of the same arrangement in this application as in my above-identified earlier patent, except that the torque frame and its associated apparatus are added in accordance with the present invention.

Figure 1:
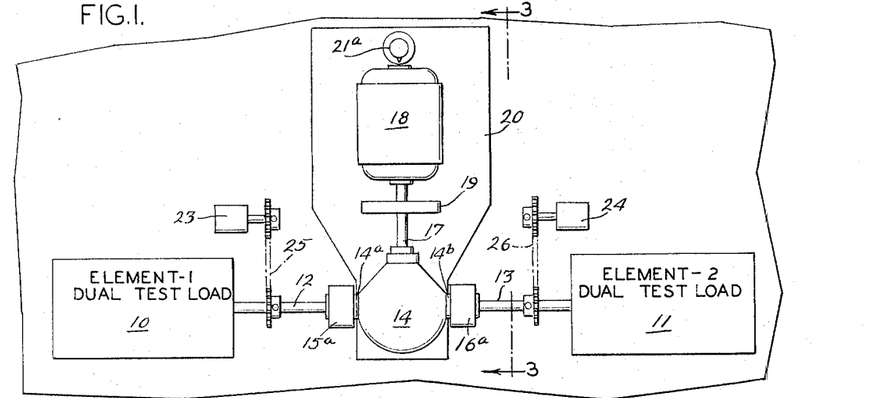
FIG. 1 illustrates preferred embodiment of the present invention in plan view from above without the details of the electrical circuitry.
Figure 2:
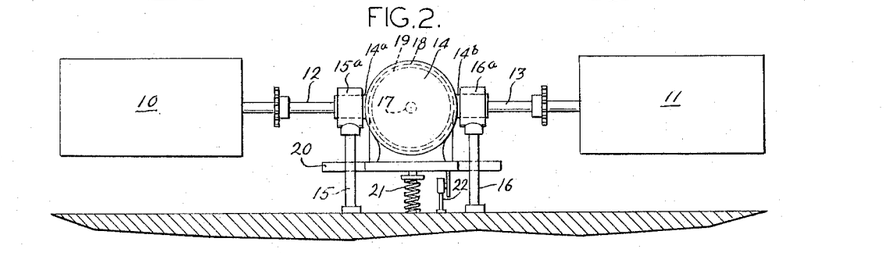
FIG. 2 is a front elevational view of the structure shown in FIG. 1.
Figure 3:
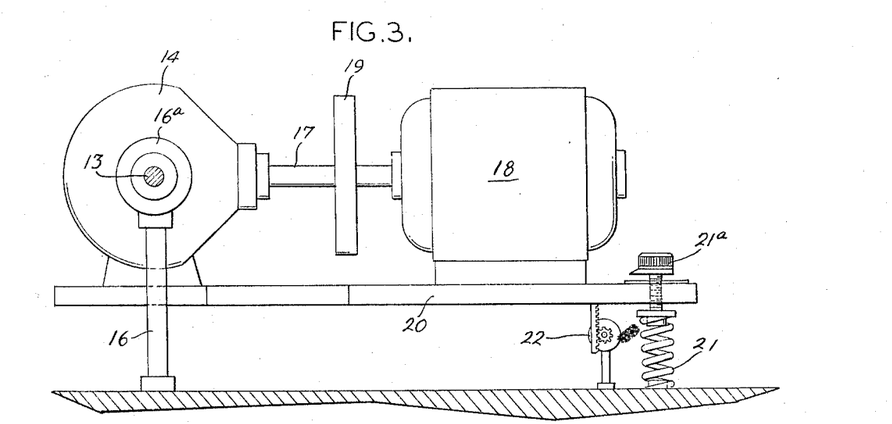
FIG. 3 is an enlarged view taken along lines 3—3 of FIG. 1 showing most of the structure in side elevation.

Referring first to FIGS. 1–3, the rollers 10 and 11 may be thought of as generally representing elements 1 and 2 of a dual test load. As a practical matter in a chassis dynamometer these rollers are used in combination with idler rollers (not shown) having their axes parallel to and their surfaces almost in contact with the rollers 10 and 11 so that the wheels of the vehicle may rest between the idler and the test rollers. The rollers 10 and 11 are so spaced as to accommodate each of the driven wheels of vehicles of various sizes. The arrangement of FIGS. 6 and 7, which will be considered hereafter, provides for the situation in which a dual axle tandem drive vehicle requires testing. In FIGS. 1–3 construction rollers 10 and 11 are supported on aligned shafts 12 and 13, respectively, which are connected by gearing in differential 14. The shafts 12 and 13 are supported preferably by support of part of the differential housing 14a and 14b. Their support relative to the ground, base frame, or foundation is through support columns 15 and 16 including trunnion bearings 15a and 16a.

The differential in conventional fashion connects load shafts 12 and 13 to a differential shaft 17 which is connected to the motor 18 through flywheel 19. The rotatable structure out of line with shafts 12 and 13, and including shaft 17, flywheel 19 and the rotor of the motor 18, are part of the test load device. The test load device is preferably capable of motoring as well as absorbing energy from the load to be tested as is the case here because of motor 18. Motor 18 is preferably an A.C. motor which tends to operate at essentially fixed speed under all load conditions. Both the differential 14 and the motor 18 are mounted on torque frame 20. Torque frame 20 and the structure it carries is rotatably supported at one end through the housing of the differential 14, trunnion bearings 15a and 16a, and columns 15 and 16. In order to clear the support columns 15 and 16, the torque frame 20 is cut away beneath the extension arms 14a and 14b of the casing of differential 14. At the end of the torque frame remote from its thus rotatably supported end is a calibrated spring 21 which, relative to the ground, yieldably supports the end of the torque frame opposite that supported by shafts 12 and 13. It perhaps should be mentioned that the weight of the structure on the torque frame and the degree to which it is out of balance makes it unnecessary in most instances to provide springs both above and below the frame. The weight acts to precompress the spring so that even if movement is upward (counter-clockwise in FIG. 3) it is still under control of the spring as energy is released. This may be considered to represent a negative torque whereas further compression may be taken to represent positive torque. In other embodiments it may be necessary to employ two springs, one to absorb positive and one to absorb negative torque or a single spring arranged to accept both compressive and tensional forces.

Since the angle of rotation in response to torque loads within the capacity of the dynamometer can be made so small and the torque frame usually is on the order of at least 6 feet long and extends generally horizontally from its support at trunnion bearings 15a and 16a, the linear movement relative to the ground at some point near the end of the torque frame remote from the supporting bearings, is for practical purposes proportional to the change of angle over very small angles. Since the torque frame is horizontally arranged, a suitable scale vertically arranged on the ground to give an accurate indication of torque frame position may be directly calibrated in terms of torque.

A ruler or linear scale for a linear system properly calibrated as described above will serve quite adequately as a torque scale. However, a more practical device for this purpose is a potentiometer 22 or other variable impedance device which is arranged so that its impedance is changed in proportion to the vertical change in position of the remote point on the torque frame to which it is attached. The potentiometer may be provided with a pinion shaft and have its casing fixed to the ground so that a rack suitably arranged on the frame will drive the pinion shaft as shown in FIG. 3. Any other suitable arrangement of a potentiometer or any other variable impedance device may, of course, be substituted.

Also associated with the apparatus are a pair of tachometers 23 and 24 which are connected by positive drive means such as chains 25 and 26 and suitable sprocket wheels to the shafts 12 and 13 to measure speeds of these shafts and hence the speed of the roll elements 10 and 11. The tachometers are linear devices which can be calibrated directly in terms of speed, such as the road speed of an automotive vehicle which is directly impressed upon the rolls 10 and 11.

The use of the device is fundamentally the same as with similar devices of the prior art. In the chassis dynamometer the vehicle which constitutes the load to be tested is placed on the dynamometer by placing its rear or driven wheels on the test load elements or rollers and, depending upon the particular test applied at any given time, the engine of the vehicle is driven, or allowed to be driven, by the motor drive 18 of the dynamometer which is constantly kept energized.

In this case, unlike my Patent No. 3,020,753, issued February 13, 1962, horsepower is not measured by the tachometers 23 and 24. Here tachometers 23 and 24 are used purely to obtain a reading of load speed. Torque is obtained from the position of torque frame 20 relative to the ground. The two results may be combined in accordance with the general horsepower formula $$\text{power} = \frac{\text{torque} \times \text{speed}}{\text{constant}}$$

to obtain a power reading.

Before torque or power readings are made in each case, a zero position of the torque frame has to be established dynamically. In accordance with the arrangement of the present invention, an elevated zero unique for the load under test is obtained by balancing or nulling out both static and dynamic effects of friction and the like while the dynamometer is running. In other words, the present device is dynamically balanced so that friction and other loss loads are already compensated and all readings from that point are only the effect to be measured. This is made possible by the support of the test load device including the differential 14, flywheel 19 and the motor 18 for rotation about the shafts 12 and 13 as described above. If there were no frictional or other loss effects in the system, when the devices were started up and operated without a load in place, a fixed zero reading would be accurate, but this would only be under no load conditions, i.e., without the load to be tested in place. As a practical matter, however, friction and other losses in the dynamometer can never be fully eliminated. In a practical prior art structure trunnion mounting of the motor which is provided with a lever arm to which weights are added enables static tare balancing. It does not permit dynamic balancing, however, nor does it correct either static or dynamic error due to friction in the trunnion bearings themselves. Systems for minimizing bearing friction in laboratory dynamometers by elaborate and costly hydrostatic bearings, for example, have been commonly used at great cost. The cost of such bearings has prevented their use in the coupling structure between the test load device and the device to be tested in field dynamometers, like chassis dynamometers, however. Moreover, as soon as a load is added, its frictions and losses even in a friction compensated dynamometer constitute a load effect which in most cases is over and above the load sought to be measured.

The present dynamometer relies on its novel structural arrangement employing the torque frame to determine torque effects of any kind. It happens that frictional and other loss effects are really in the nature of loads which are overcome by torques and the sum of all these torques in the dynamometer apparatus appears when "no load" other than those frictions and losses are applied. The torques of these frictions and losses drive the torque frame from the rest position to a new position. In this respect these torque effects are just like those experienced from any load including the load to be tested. The torque acting at a fixed lever arm against spring 21 applies so many pounds of force to the spring which compresses accordingly to store the energy and oppose the applied force with equal and opposite force. This new position may be taken as the "no load" elevated zero position but it is not desirable to permanently calibrate the system since these frictional and other effects may change between tests, causing the "no load" zero position also to change. In the usual case where electrical instruments are used to record torque or horsepower, a new zero position representative of the elevated zero torque frame position is easily obtained by running the dynamometer at speed and resetting the meters to read zero. It is alternatively possible to move the frame by screw adjustment 21a to a position at which the meters read zero under dynamic operating conditions. In any event, by some adjustment all frictional and other losses, which appear as a loading, are balanced out.

If the meters used and the dynamometer system are linear, recalibration each time a new zero is established is probably unnecessary. However, calibration may be easily accomplished by applying a known external load at the rolls 10 and 11. As a practical matter, however, since all torque effects are of the same nature no matter how imposed, the device may be more precisely calibrated while running by placing a known weight at a known lever arm distance on the torque frame from the center of shafts 12 and 13. The torque frame's response to this torque load will be the same as response to the test load, i.e., it will assume the form of deflection from elevated zero position of the torque frame and the meters which merely reflect the torque frame position. If calibration is inaccurate, it can then be adjusted.

Figure 4:
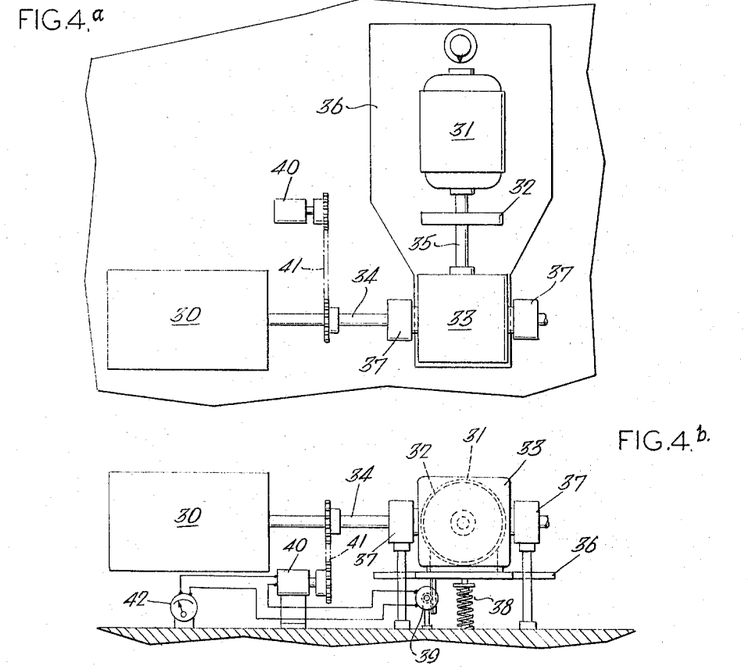
FIGS. 4a and 4b are schematic views in plan and elevation showing a modified version of the present invention, including a circuit arrangement for direct measurement of horsepower.

The value of a potentiometer or any other variable impedance device may be appreciated by a consideration of FIGS. 4a and 4b which show highly schematically an arrangement of what might be thought of as the simplest possible system of the present invention. This would employ a simple test load 30 connected to a motor 31 and flywheel 32 or other suitable test load device by means of a coupling 33 which may simply be a direction-changing device, such as simple bevel gearing, so that the shaft 34 coupled to the device under test may be placed out of alignment with the shaft 35 of the test load device. The housing for this coupling 33 and the test load device 31 must both be fixed to the torque frame 36. Trunnion bearings 37 rotatably support torque frame 36 relative to the ground about the axis of rotation of shaft 34, for example, by extensions on the housing of coupling 33. Again, the torque frame 36, which is statically out of balance about the shaft when the system is stationary, has its free end supported by a calibrated spring 38 or other suitable energy absorbing means. The position of frame 36 is determined with a transistory potentiometer 39 of the type previously described in connection with potentiometer 22 of FIGS. 1–3. Tachometer 40 is connected by a chain 41 and sprocket wheels to shaft 34 and hence provides a voltage proportional to the speed imposed by test load 30. The output of the tachometer 40 is connected through potentiometer 39 to meter 42 which may be calibrated directly by the above horsepower formula. This may be done automatically electrically as shown in FIG. 4b by connecting the impedance of the potentiometer 39 in series with tachometer 40 across milliammeter 42. Calibration may then be achieved, for example, by using a variable impedance in parallel with the meter or using the calibration adjustment means on the meter. The elevated zero is determined by running the motor 31 at test speed without the test load 30 coupled to shaft 34. Preferably, this is accomplished by setting meter 42 at zero under these conditions. It may also be accomplished by adjusting frame portion through the screw 38a until the meter reads zero but this usually is less convenient. Calibration is achieved after zero set by placing the known weight at a predetermined point (lever arm) on the torque frame at the same predetermined test speed so that a known horsepower effect is simulated. Errors in the meter can be adjusted until it reads the proper horsepower simulated by the load. If zero set has not been changed and the system is linear, a linear scale on the meter calibrated in terms of horsepower should then give accurate horsepower readings.

Figure 5:
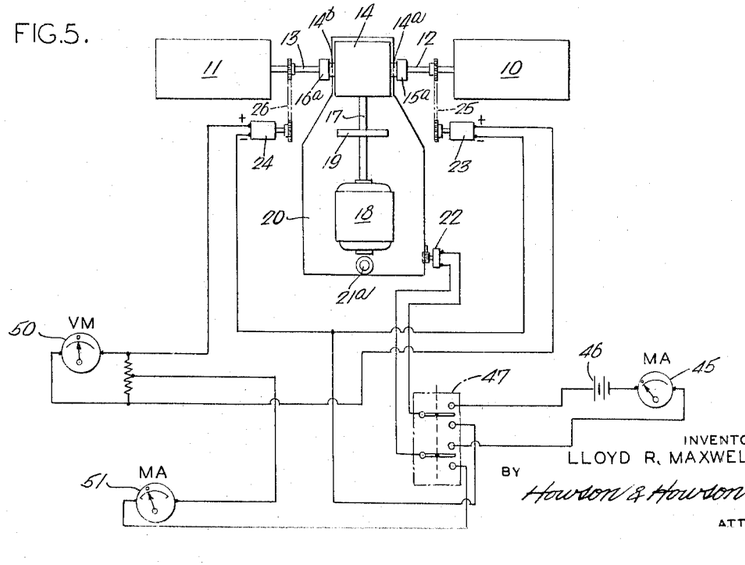
FIG. 5 is a schematic view of the system shown in FIG. 1 showing the electrical circuitry involved where tractive effect, horsepower and wheel balance is to be measured.

FIG. 5 shows the arrangement of FIGS. 1–3 with one possible circuit arrangement which may be used in connection with the tachometers and the transistory potentiometer 22 for obtaining torque or tractive effect, horsepower, and balance readings.

A milliammeter 45 connected in series with a battery 46 or other suitable voltage source may be connected by means of double-pole, double-throw switch 47 in one position directly in series with transitory potentiometer 22. In this event, the meter 45 indicates torque or tractive effect and it may be so calibrated. The tachometers 23 and 24 may be connected into a circuit with potentiometer 22 in the other position of switch 47 in order to read horsepower. The circuit shown provides an average speed effect but other circuits may be employed to sum the speeds of the separate rolls or to do otherwise as required. A balancing meter 50 which is a center-reading voltmeter device is so arranged that it indicates zero if the tachometers exactly oppose one another indicating that their speeds are exactly the same. If the speeds are not the same, the tachometer which is driven faster will indicate on its side of the meter approximately how much faster it is driven than the other tachometer. This is particularly useful in adjustments such as brakes, general wheel alignment, etc., where information about the relative effects of the respective driven wheels is of importance. Meter 51 is calibrated in horsepower and reads positive horsepower upscale and negative horsepower downscale when the position of switch 47 connects both tachometers 23, 24 and potentiometer 22 in circuit with it.

Figure 6:
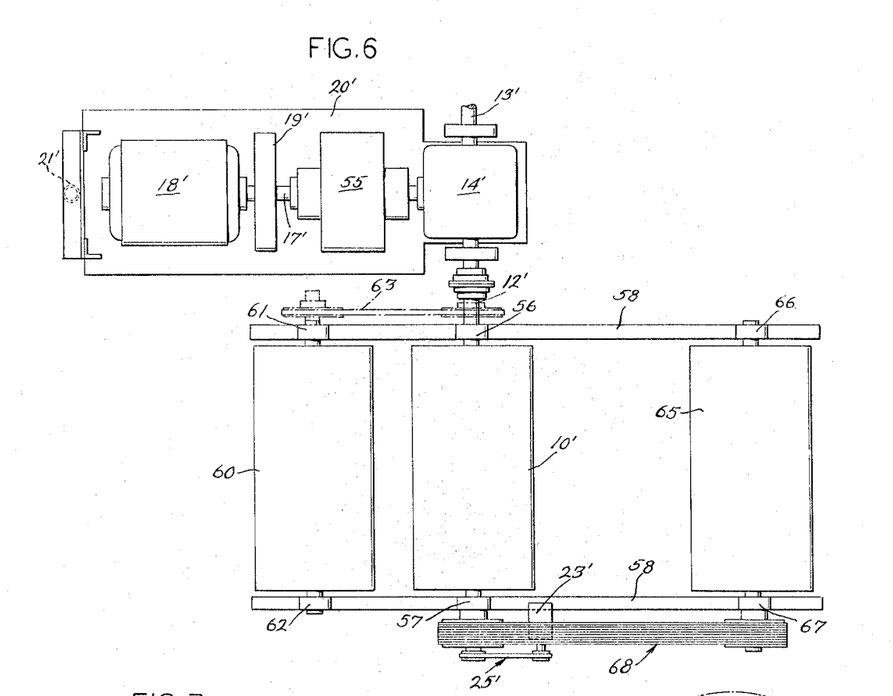
FIG. 6 is a plan view from above showing part of a system similar to that of FIGS. 1–3 but permitting similar measurements where wheels are driven in tandem.
Figure 7:
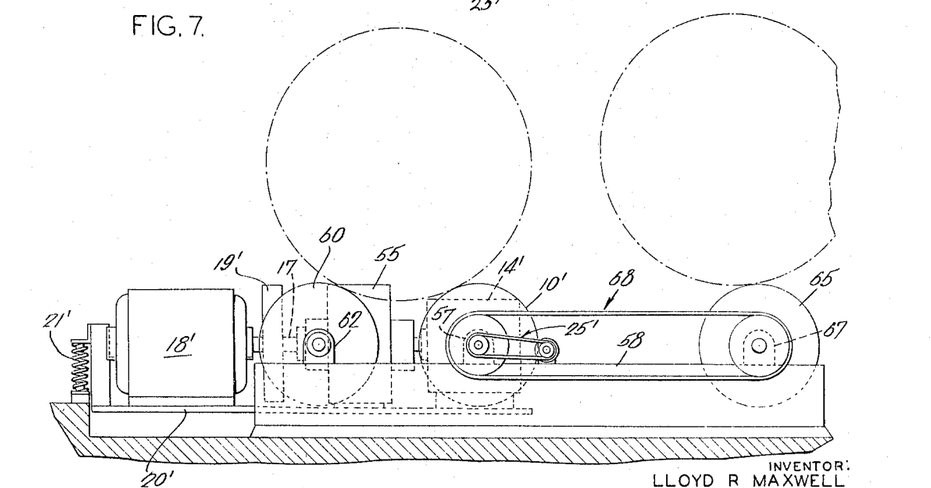
FIG. 7 is a side elevational view showing the arrangements for wheels driven in tandem.

Referring to FIGS. 6 and 7 an arrangement similar to that of FIGS. 1–3 with only the rollers on one side is shown. Since the structure is similar to that of FIGS. 1–3 similar number designators with the addition of primes thereto are used to identify parts corresponding to those in the structure of FIGS. 1–3. Here, however, certain additional structure is shown. For example, a transmission device 55 whose functions will be explained hereafter is also mounted on torque frame 20′ and constitutes a part of the test load device together with squirrel cage motor 18′ and differential 14′. The roller 10′ is supported in bearings 56 and 57 on a suitable support frame 58. These bearings are some of those earlier mentioned as adding frictional loss effects which can be compensated for the first time by my present invention by use of the elevated zero technique. Ordinarily, the idler rollers, such as roller 60, supported on bearings 61 and 62 in frame 58 cause so little error that they need not be considered. However, if complete accuracy is desired a chain and sprocket positive drive connection 63 shown in dot and dashed lines may be employed. This positive connection without slippage assures that all losses due to bearings 61 and 62 may be included in the no load torque effect on torque frame 20′ and compensated for in the elevated zero adjustment.

Similarly, one or more tandem rolls 65 may be added to take care of multiple axle trucks without the use of separate test load devices for each axle, as has been done in the prior art. Here again the frictions in bearings 66 and 67 and other losses due to the tandem roll 65 are included in the compensation of the zero set by positively connecting rolls 10′ and 65 so that they are positively driven together at the same speed. Such a system assumes special significance in the Mack dual axle system wherein power taken from one axle will be transferred to the other axle. Using idler rolls for one set of the tandem wheels with such a truck, it has never been possible to obtain proper readings. Using my system of FIGS. 6 and 7, the problem is solved since truck performance will be exactly as on the highway.

In accordance with the present invention, in order to avoid the necessity of re-calibration at different speeds, it is desirable to employ a system which operates at a fixed speed. Some sort of A.C. motor capable of rotation at a speed which is essentially a synchronous speed is, therefore, desirable.

A synchronous motor is, of course, more precise for this purpose. But, from the standpoint of simplicity, a squirrel-cage induction motor is usually preferred and while if a squirrel-cage motor is used, the amount of slippage which occurs as the motor is loaded may make a change in speed, the slippage and such change do not affect the reading materially. Furthermore, the slippage tends to be linear. Therefore, any error which may be introduced because of the relatively small changes of speed is not only negligible but may be corrected by some linear technique if even greater precision is required. Even without correction, a squirrel-cage induction motor gives an accuracy far beyond that of any present field dynamometer and at least on the order of that expected of laboratory types which are far more complicated and complex.

Figure 8:
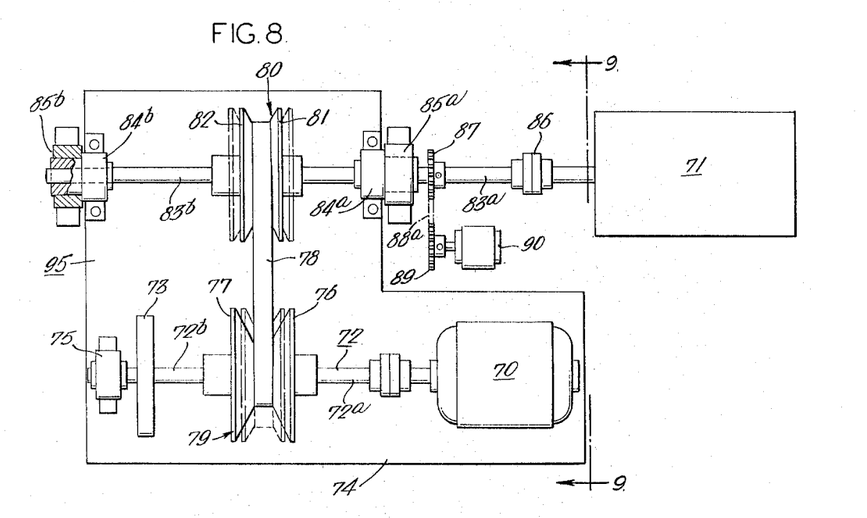
FIG. 8 is a plan view from above showing schematically a modified system to which a variable load effect feature has been added.
Figure 9:
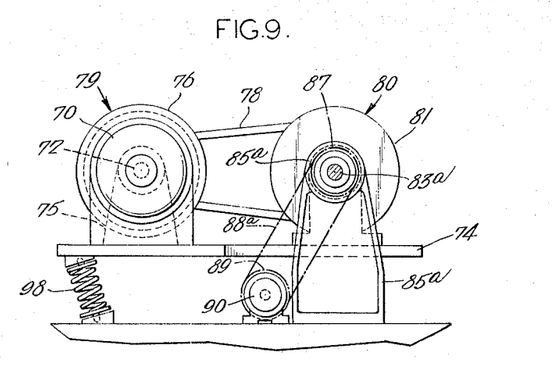
FIG. 9 is a view taken along line 9—9 in FIG. 8 showing most of the structure in elevation.

In FIGS. 8 and 9, there is shown schematically a modified dynamometer structure employing a modified inertia changing arrangement. This system preferably includes as a test load device, including an A.C. induction motor 70 suitably coupled, as will be described, to a load 71, here schematically indicated as a box. The load may be either an energy absorbing or an energy generating type of device, or both. The motor 70 and the rotatable structure serving as the test load device is mounted on torque frame 74. Connected to motor 70 by shaft 72 is a flywheel 73 of fixed inertia properties. All of this rotatable structure is part of the test load device. The shaft 72 is divided into at least two portions 72a and 72b which are separately supported on the shaft of motor 70 by shaft bearing support and control member 75 on the torque frame 74. By suitable means (not shown), the two separate frusto-conical portions 76 and 77 (together constituting sheave 79) on shaft portions 72a and 72b, respectively, may be moved toward or away from one another to thereby change the effective pulley diameter for belt 78. Belt 78 runs between sheave 79 (frusto-conical parts 76 and 77) and sheave 80 (frusto-conical parts 81 and 82). Parts 81 and 82 are synchronously moved apart as parts 76 and 77 are moved together and vice versa by similar coordinated mechanisms. The movements are instituted and coordinated by conventional means (not shown). As a consequence of the synchronization the belt path 78 always has a length identical to that of the belt. Frusto-conical member 81 is supported on the shaft portion 83a and frusto-conical member 82 is supported on shaft portion 83b. Shaft 83b is supported in suitable bearing 84b. Shaft 83a is supported on similar bearing 84a. The torque frame 74 is rotatably supported by trunnion bearings 85a and 85b which may support the torque frame by means of extensions of bearing supports 84a and 84b, respectively. Shaft 83a is connected through a suitable coupling 86 to the load 71. Also on shaft 83a is a sprocket wheel 87 rigidly affixed to the shaft, which, through a chain 82a drives another sprocket wheel 89 on the shaft of tachometer 90. This arrangement enables determination of horsepower by the technique described in my above-identified application.

All of the structure associated with the test load device including the motor 70 and its shaft 72a and 72b are mounted on a torque frame in the form of a platform 74. As in other embodiments, this platform 74 rotates about the same axis as that of aligned shafts 83a and 83b by virtue of its trunnion mounting relative to the ground on bearing supports 85a and 85b. In the embodiment shown the trunnions are provided by extensions from shaft bearing supports 84a and 84b. Rotation of the platform is opposed at its edge remote from its trunnion support by one or more calibrated compressed spring means 98 between the platform 35 and the ground so arranged that the spring normally absorbs any out-of-balance weight and other static effects by compression and its compression increases or decreases linearly with torque or tractive effort dynamic load effects applied.

In operation, the tachometer voltage reading is combined with a torque position indication of the position of torque frame 74 to obtain a horsepower reading as in the above-described embodiments with my application Serial No. 46,957. The flywheel 13 which is permanently attached to motor 70 provides a constant inertia effect on the motor. However, by virtue of the variable speed drive arrangement, whereby the relative speed-power ratio can be adjusted between the motor 70 and the load 71, the inertia effect of the flywheel upon the load can be correspondingly adjusted. Since the kinetic energy is equal to the product of one-half the mass times the square of the velocity, by leaving the mass constant and adjusting the velocity, a different inertia effect or kinetic energy input is obtained.

In changing from one inertia effect to another, as the adjustment is made any addition to or subtraction from the kinetic energy of the flywheel is immediately measured by the torque arm. Thus horsepower and tractive effect changes are immediately readable without waiting for the flywheel to stabilize. This is because prior art systems have depended for their reading upon the actual adjusted speed of the load to be tested, and here a torque effect compensates for each change in speed. Thus this embodiment not only permits greater ease in changing from one inertia effect to another but permits a major savings in time by not requiring stabilization of speed before measurements are taken.

A similar effect is achieved in the embodiment of FIGS. 6 and 7 which by means of its transmission 55 changes the effect of inertia of the test load device on the load to be tested. As in the other apparatus the motor 18' and all rotating structure on the torque frame out of line with the axis of rotation of the frame 20' and shaft 13', including the flywheel 19' and transmission 55 through the differential 14', are fixed relative to a torque frame 20'. The torque frame is suitably supported from the ground by a calibrated compression spring 21' which is so arranged that it may yield some of the energy stored due to out-of-balance static weight effects in response to dynamic torque load effects in one direction as well as storing additional energy by further compression of the spring when dynamic torque effects occur in the direction as the static effects.

It will be observed that in either FIGS. 8 and 9 or the FIGS. 6 and 7 embodiments the flywheel is mounted on the motor side of the transmission and has fixed mass. The transmission allows the adjustment of the effective speed-power ratio from the flywheel to the load coupling shaft through the transmission. The choice between FIGS. 8 and 9 and FIGS. 6 and 7 is a choice between continuous adjustment through a range and a limited number of gear combinations, a limited number of discrete speed-power ratios. However, in the FIGS. 6 and 7 arrangement, by selection of suitable transmission, tests may be run at standard speed-power ratios and adjustment may be quickly and accurately made without the more elaborate and expensive apparatus of FIGS. 8 and 9.

Heretofore it has been common to locate dynamometer flywheels in a position most accessible for changing the flywheel. It has been necessary in order to modify the inertia effect at a given speed to replace the flywheel with one of another weight or to add or subtract weight by adding or removing discs. This has necessitated stopping the dynamometer, exchanging the flywheel, and accelerating up to speed again. All of this procedure has been time consuming, but even greater loss of time has been experienced in allowing the dynamometer to stabilize after it comes up to speed. Stabilization has been necessary even when changing from one speed to another without the use of the flywheel. To avoid loss of time, tests have been run at one speed and one inertial condition, or at most at two or three speeds whereas perhaps many more were advisable. The present invention makes inertial adjustments quickly and therefore permits tests at any selected range of speeds or inertia loads.

The present invention has the great advantage over the prior art that no matter what types of losses are present whether static or dynamic, they can be effectively compensated. Moreover, the sizes of these losses are not important so that special low friction bearings and other high cost equipment need not be acquired. It is a flexible system since all losses of whatever kind can be balanced out completely at the time of the test so that differences in losses from time to time are not important and so that whenever and wherever tests are made they should provide the same results with the same test load device.

Another advantage of the present invention is that the elevated zero selected to balance out loss effects can be selectively chosen to eliminate different losses for different tests where those losses can be isolated from one another. Illustrative of this effect are certain tests which may be performed by automotive dynamometers on engines in vehicles to obtain accurately engine horsepower at the clutch without removal of the engine from the vehicle, something which has been done only very inaccurately in the prior art.

In the particularly elevated zero case where the dynamometer includes no motor the vehicle is placed on the dynamometer and the zero is set with the whole system running at the selected test speed. Therefore all static and dynamic losses of the dynamometer, all static and dynamic losses of the rolls and other coupling equipment and all static and dynamic losses of the vehicle itself are nulled out when the zero is adjusted by any means which causes the meter to read zero without changing its calibration.

First, after elevated zero adjustment at test speed, the vehicle engine is fully accelerated, as by pressing the gas pedal to the floor. Before the speed of the system can change there is an immediate torque effect changing torque frame position and this change is due entirely to power from the engine. This may be called road reserve engine torque (or horsepower if that is measured).

The second test is used to determine vehicle parasitic losses and dynamometer losses, those losses which the engine must drive through and first overcome before it can deliver reserve power. This is measured by again returning the vehicle to test speed and its elevated zero condition. When a steady state condition is attained, the vehicle's clutch is disengaged. With the vehicle thus declutched and before the speed changes, the change in torque is recorded as a change in torque frame position. This change is a measure of the torque (or horsepower) required to overcome the parasitic losses of the vehicle and dynamometer losses through which the engine must drive.

By running these tests in succession and adding the results gross engine horsepower (or torque) at the clutch is obtained. In other words, the sum of the vehicle losses and dynamometer losses through which the engine must drive before producing the reserve above this which is available to accelerate the vehicle together account for all the power developed by the engine at its clutch.

This condition is one in which the dynamometer includes no means of developing power itself in its test load device, i.e., where the total effect is inertial as by means of a flywheel alone. In this situation there is no means of nulling out the dynamometer frictions and losses so that upon accelerating from the same fixed predetermined speed less road reserve horsepower is available the difference being accounted for by dynamometer losses, which are discussed below. When the vehicle is declutched, however, at the predetermined speed the decelerating horsepower involved will include both automative drive line frictions and losses and dynamometer losses both of which have had to be overcome by the engine. These losses plus the amount of power left in reserve must total the horsepower delivered at the clutch or net engine horsepower.

There are two conditions which can exist within the scope of the present invention. First is the situation described in some detail above where the test load device does not include a motor. The second is that situation where the test load device does include a motor. In that situation by motoring with no test load at a fixed predetermined speed the dynamometer losses can be separated and nulled out so that the elevated zero excludes them. Thereafter the vehicle is placed on the dynamometer. In this event as the engine is accelerated from the predetermined speed only road reserve horsepower is developed. Likewise in the other test, as the vehicle is declutched while running at the predetermined speed vehicle losses only are measured in terms of horsepower. The sum of these two horsepower measurements is the total horsepower delivered by the engine at the clutch, or its net engine horsepower.

From the above the great advantage of the dynamometer system employing its own prime mover in its test load device can be seen. It will be observed that, in fact, using a system employing a motor, if the motor is not energized it may be used as a pure flywheel system. In fact by making two measurements alternatively of net engine horsepower or of power consumed by the system after establishing the respective elevated zeros the difference in the readings of road reserve horsepower or alternatively in the readings of power consumed by the system represents the losses in the dynamometer and provides one convenient way of checking these losses.

If the measurements above are analyzed the total horsepower developed is divided into three components: (A) vehicle parasitic or drive line losses, (B) dynamometer losses and (C) net reserve engine horsepower. By the present system $A+B+C=100\%$ of available horsepower. By systems of the prior art which do not make measurements from a dynamically stable predetermined fixed speed, both a road reserve horsepower and power absorbed through losses are measurable. However in accelerating from zero the reserve engine horsepower measured is $B+C$ (dynamometer losses and engine reserve horsepower) while system losses measured are $A+B$ (vehicle parasitic losses and dynamometer losses). Were these two readings added their sum would be $A+2B+C$ which is obviously in excess of total engine horsepower by an amount B. This has not been appreciated fully in the prior art but some of the better dynamometers built have implicitly recognized the problem by not attempting to measure total or gross power available at the clutch, a reading reserved for engine dynamometers in the laboratory. The best they have attempted to do is give some reading of net engine horsepower available from which they have not been able, and have not attempted, to separate dynamometer losses. They have known that by minimizing dynamometer losses a better and more nearly accurate reading could be attained and in may cases their effort has accordingly gone into reducing dynamometer frictions. Only by the applicant's invention however, has it become possible to effectively eliminate these frictions from road reserve horsepower readings without even having to minimize dynamometer losses. Moreover, only by the applicant's invention for the first time can an automotive dynamometer read available gross engine horsepower without removal of the engine from the vehicle for testing on an expensive essentially frictionless laboratory dynamometer.

With the present invention even laboratory dynamometers may be made without regard to frictional losses since those losses are nulled out by the elevated zero technique.

Other tests are possible. For example, the spark plugs may be successively shorted out and gross horsepower noted each time. The difference in gross horsepower with all plugs working and with each plug shorted is calculated and represents the power lost as each plug is shorted. The difference between the sum of these lost powers and the gross power represents losses attributable to the engine itself.

In all tests in which the engine must be declutched, it is particularly important that the inertia of the test load device be sufficiently great to cause some delay in effect and maintain speeds against accelerating or decelerating forces for sufficiently long to obtain a satisfactory reading. Few systems have sufficient inertia without the addition of a flywheel of substantial size. Where vehicles of various sizes are to be tested, the use of the transmission of FIGS. 6 and 7 or the variable drive of FIGS. 8 and 9 permits effective change in the inertial effects. It is important in all cases that the flywheel be mounted on the troque frame. In fact, all the test load device by definition is the rotatable structure on the torque frame and out of alignment with the trunnion axis.

In using the device of the present invention, many conventional tasks may be performed but their performance will be with greater accuracy because the device is dynamically compensated eliminating thereby for the first time errors due to dynamic effects as well as errors due to static effects which had not been eliminated according to previous techniques.

As implied by the schematic drawings in this case, and particularly that of FIGS. 4a and 4b, the coupling between the load to be tested and the test load device is not limited to roller system or any other specific type of intermediate structure. For example, it is conceivable that it might be desirable to test a power boat in which case a suitable coupling arrangement for the purpose may be devised. Another example of modified use, because of the relatively portability of the dynamometer of the present invention, is for testing off highway devices such as heavy pieces of construction equipment which would be difficult and expensive to bring into a shop for testing. However, the present invention will find particularly advantageous application with automotive vehicle dynamometers.

Many other modifications of structure such as the shape and location of the torque frame and selection of elements for the test load device will occur to those skilled in the art. All such modifications and variations within the scope of the claims are intended to be within the scope and spirit of the present invention.

I claim:
1. A dynamometer system comprising
   a rotatable test load device,
   a torque frame to which the test load device is affixed and to which reactive forces from said test load devise are applied,
   means including trunnion bearings rotatably supporting the torque frame relative to the ground and acting as a pivot about which reactive forces are applied,
   a shaft rotatably supported relative to the torque frame coaxial with the axis of rotation of the torque frame at a finite angle with the axis of rotation of said test load device for coupling to a device to be tested,
   a drive connection between the shaft and the test load device,
   energy storage means between the ground and the torque frame at a point remote from said shaft so that it opposes with equal and opposite force all forces whether static or dynamic applied to the torque frame, including reactive forces applied from said test load device regardless of the direction of the reactive forces and so that tractive effort measurements of a device to be tested may be made with the device to be tested both driving and being driven and the measurements summed to obtain total tractive effort without reading the effect of dynamometer frictions and other losses twice, whereby the torque frame assumes a unique balanced position for each condition of loading,
   means directly calibratable in terms of tractive effort to indicate the position of the torque frame relative to the ground, and
   adjustment means whereby under dynamic conditions of operation any selected position of the torque frame may be taken as a zero position from which measurements may be made.

2. The dynamometer of claim 1 in which the energy storage means is precision spring means arranged to be effective against both positive and negatve torques.

3. The dynamometer of claim 1 in which adjustment means amounting to a zero setting of the device is provided to enable modification of torque frame position by a fixed amount relative to any position said frame might otherwise assume under load in order to permit cancellation of torque effects due to system losses.

4. The dynamometer of claim 1 in which the means indicating tractive effort includes a variable impedance so constructed and arranged as to limit current passing therethrough in different amounts corresponding to different positions of the torque frame representing tractive effort.

5. The dynamometer of claim 1 in which the test load device includes a synchronous speed alternating current motor.

6. The dynamometer of claim 1 in which the test load device includes a flywheel rotatably supported by the torque frame and thereby adds substantially to the rotational inertia of the test load device.

7. The dynamometer of claim 6 in which the test load device includes a motor and a flywheel between the motor and a direction changing coupling element, wherein the motor and the direction changing coupling element are both mounted on the torque frame.

8. The dynamometer of claim 1 in which the test load device includes means for changing the effect of the test load device located between the principal energy storage portion thereof and the shaft for coupling to the device to be tested whereby the inertial effect of the same test load device on a given device to be tested can be varied.

9. A dynamometer system comprising a rotatable test load device,
   a torque frame to which the test load device is affixed and to which reactive forces from said test load device are applied,
   means including trunnion bearings rotatably supporting the torque frame relative to the ground and acting as a pivot about which reactive forces are applied,
   a shaft rotatably supported relative to the torque frame coaxial with the axis of rotation of the torque frame at a finite angle with the axis of rotation of said test load device for coupling to a device to be tested,
   a drive connection between the shaft and the test load device,
   energy storage means between the ground and the torque frame at a point remote from said shaft, so that it opposes with equal and opposite force all forces whether static or dynamic applied to the torque frame, including reactive forces applied from said test load device regardless of the direction of the reactive forces and so that power measurements of a device to be tested may be made with the device to be tested both driving and being driven and the measurements summed to obtain total power without reading the effect of dynamometer frictions and other losses twice, whereby the torque frame assumes a unique position for each condition of loading,
   means to indicate the position of the torque frame relative to the ground,
   means for coupling to a rotatable element of the device to be tested to indicate the speed of the device to be tested,
   means to combine the indications of torque shown by torque frame position and the indications of speed to obtain an indication of power at all possible positions, and
   adjustment means whereby under dynamic conditions of operation any selected position of the torque frame may be taken as a zero position from which measurements may be made.

10. The dynamometer of claim 9 in which the means indicating tractive effort includes a variable impedance so constructed and arranged as to limit current passing therethrough in different amounts corresponding to different positions of the torque frame representing tractive effort and the means indicating speed includes a voltage generating tachometer generator arranged in series with the variable impedance and a meter calibrated directly in terms of power.

11. The dynamometer of claim 9 in which the test load device includes a synchronous speed alternating current motor.

12. An automotive dynamometer comprising
   a rotatable test load device,
   a torque frame on which the test load device is mounted and to which reactive forces from said test load device are applied,
   a differential mounted on the torque frame having a shaft coupled to the test load device,
   means including trunnion bearings rotatably supporting the torque frame relative to the ground and acting as a pivot about which reactive forces are applied,
   a pair of roller supporting shafts each rotatably supported and coupled to the test load device through separate aligned shafts of the differential which shafts are at a finite angle with the axis of rotation of the shaft coupled to the test load device,
   spring means positioned and arranged to oppose the movement of the torque frame relative to the ground at a position remote from said trunnion support, so that it opposes with equal and opposite force all forces whether static or dynamic applied to the torque frame, including reactive forces applied from said test load device regardless of the direction of the reactive forces and so that tractive effort measurements of a device to be tested may be made with the device to be tested both driving and being driven and the measurements summed to obtain total tractive effort without reading the effect of dynamometer frictions and other losses twice,
   means directly calibratable in terms of tractive effort to indicate the position of the torque frame relative to the ground, and
   adjustment means whereby under dynamic conditions of operation any selected position of the torque frame may be taken as a zero position from which measurements may be made.

13. The dynamometer of claim 12 in which the means calibrated in terms of tractive effort is a variable impedance which limits current in different amounts for different positions of said frame relative to the ground.

14. The dynamometer of claim 13 in which tachometer generators are provided for coupling to each roller shaft to generate a voltage proportional to roller speed and in which said tachometers are simultaneously connected in series with the variable impedance and a meter which may be calibrated in terms of power.

15. The dynamometer of claim 12 in which rollers are provided on roller shafts and tandem rollers are provided to have axes parallel to the roller shafts and positively connected to rotate with the roller supporting shafts so that they must rotate together at the same speed.

16. The dynamometer of claim 15 in which the positive drive between the rollers and tandem rollers includes a chain coupling.

17. The dynamometer of claim 12 in which idler rollers are positively connected to rotate with the rollers so that they must rotate together at the same speed.

18. The dynamometer of claim 12 in which tachometer generators positively driven from the roller shafts are connected in a balancing circuit across and in which a center reading meter is included in said circuit whereby meter deflection from center shows which of the pair imposes the greater load.

19. The dynamometer of claim 12 in which the test load device is a synchronous speed alternating current motor.

20. The dynamometer of claim 12 in which the test load device is a squirrel cage induction motor.

21. The method of determining a vehicle's road reserve horsepower without removing the engine from the vehicle comprising running a dynamometer consisting of at least a rotatable test load device at a predetermined fixed speed and taking the horsepower under these conditions as zero, coupling the vehicle to the dynamometer running the engine and dynamometer at said fixed speed, fully accelerating the engine and measuring horsepower change before the speed changes which change in horsepower is road reserve horsepower.

22. The method of determining a vehicle's gross engine horsepower at the clutch without removing the engine from the vehicle comprising coupling the vehicle to a dynamometer consisting of a rotatable test load device, running the engine at a fixed speed, from said fixed speed fully accelerating the engine and measuring the change in horsepower before its speed changes, also from said fixed speed declutching the engine and measuring change in horsepower before the dynamometer speed changes and adding together the two horsepower measurements.

23. The method of determining a vehicle's road reserve horsepower without removing the engine from the vehicle comprising running a dynamometer consisting of at least a rotatable test load device at a predetermined fixed speed and taking the horsepower under these conditions as zero, coupling the vehicle to the dynamometer including a motor which tends to maintain a fixed speed, running the engine and dynamometer at said fixed speed with the motor running, fully accelerating the engine and measuring horsepower change, which change in horsepower is road reserve horsepower.

References Cited by the Examiner

UNITED STATES PATENTS

| | | | |
|---|---|---|---|
| 1,510,440 | 9/1924 | Gilman | 324—69 |
| 1,669,584 | 5/1928 | Wilkes | 73—123 |
| 2,095,142 | 10/1937 | Lurenbaum | 73—116 |
| 2,130,900 | 9/1938 | Presbrey | 73—117 |
| 2,685,199 | 8/1954 | Wilson et al. | 73—116 |
| 2,746,289 | 5/1956 | Cline | 73—117 |
| 2,785,367 | 3/1957 | Roman et al. | 73—134 |
| 3,057,192 | 9/1962 | Huffman et al. | 73—117 |
| 3,059,464 | 10/1962 | Deane | 73—116 X |

FOREIGN PATENTS 1,054,252  4/1959  Germany.

OTHER REFERENCES

Obert, E. F. Internal Combustion Engines Analysis and Practice, 2d ed., Scranton, Pennsylvania, International Textbook Co., 1959, pp. 45, 46.

Judge, A. W., The Testing of High Speed Internal Combustion Engines (fourth edition revised), Chapman and Hall Ltd., London, 1955, TJ759J8, Fig. 19 (facing p. 32).

RICHARD C. QUEISSER, *Primary Examiner.*

JERRY W. MYRACLE, *Assistant Examiner.*